Dec. 29, 1931.  J. L. GOWEN  1,838,141
JAR LID REMOVER
Filed Feb. 25, 1930
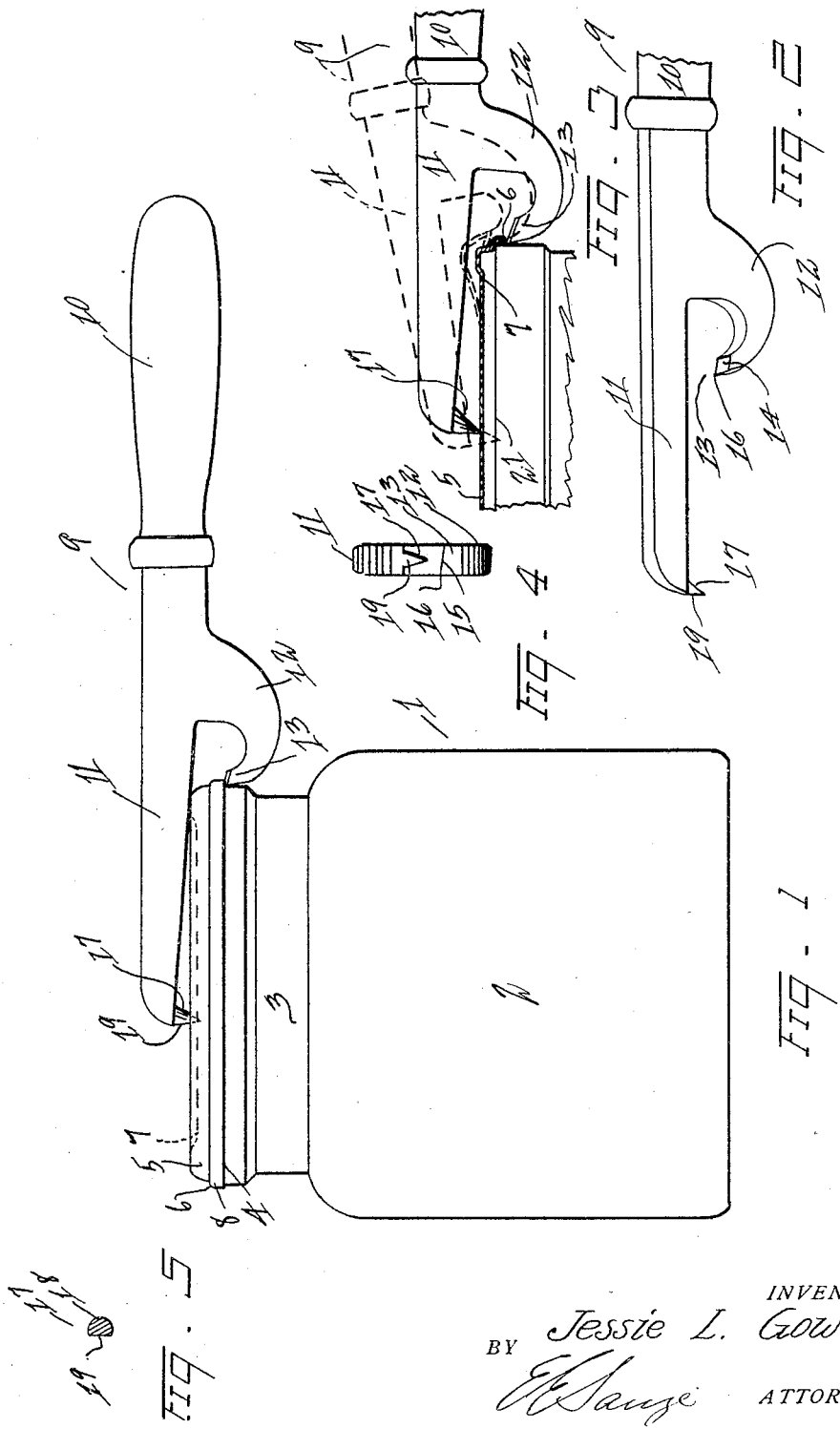
INVENTOR
Jessie L. Gowen
BY
ATTORNEY Patented Dec. 29, 1931

1,838,141

UNITED STATES PATENT OFFICE

JESSIE L. GOWEN, OF COLFAX, WASHINGTON

JAR LID REMOVER

Application filed February 25, 1930. Serial No. 431,079.

This invention relates to jar lid removers, more particularly adapted to remove the lid of a jar that is sealed thereon by vacuum aided by a packing, and has as one of its objects to provide a jar lid remover that will puncture the lid during operation and simultaneously afford a substantial bite under the edge of the lid that will be securely held in the operative position by the shape and position of the puncturing means of the remover.

Another object of the invention is to provide a jar lid remover having a peculiar bit adapted to force an entrance between the edge of the jar lid and the jar automatically during operation.

A further object of the invention is to provide a jar lid remover that will remove lids from glass jars without endangering the hands of the operator.

A further object of the invention is to provide a jar lid remover that by the peculiar shape of the puncturing point will cause the device to firmly grip the edge of the lid during the entire operation of removal.

A further object of the invention is to provide a jar lid remover that is quickly and easily applied and that will not break the jar.

A further object of the invention is to provide a jar lid remover that will remove the lid from glass containers without chipping the edge of the lid seat and thus eliminate the danger of small particles of glass entering the food.

A further object of the invention is to provide a jar lid remover that is substantial in construction, that is cheap to manufacture, and that is highly efficient in operation.

With these and other objects in view reference is now had to the accompanying drawings in which Fig. 1 is a side elevation of the jar lid remover showing its application to a jar lid;

Fig. 2 is a quartering view of the lid engaging end of the device showing the general diamond shape of the bit;

Fig. 3 is a side elevation of the lid engaging end of the device showing two stages of its operation on a lid, the lid being shown in section for the purpose;

Fig. 4 is an end elevation of the device, and

Fig. 5 is a cross sectional view of the base of the puncturing means taken at its juncture with the lever.

Having reference to the drawings, like numerals refer to like parts throughout the several views, and the numeral 1 refers to a fruit jar, of the vacuum sealed type, and consisting of a body 2, a neck 3, and a lid seat 4, and registering with this lid seat is a lid 5, of the usual vacuum seal type, and this lid is provided with an offset shoulder 6 adapted to seat on the top of the jar, to be sealed thereon in the usual manner of such operation by means of a sealing compound (not shown) and contained within the shoulder of the lid in the usual manner.

The lid 5 is depressed centrally, as at 7, for rigidity in construction, and the offset 6 of the lid terminates in a rim 8 that seats snugly around the periphery of the lid seat when the lid is in place upon the jar 2.

To remove this lid from the jar after it has been secured thereon by the above referred to sealing compound, and held in place by the vacuum, the lid remover, which is the subject matter of this invention is provided, and this lid remover consists of a lever 9 comprising a handle 10, and a shank 11 which extends forwardly and in which the lever terminates.

Depending from the lever is a hook 12 which is bent to provide a bit 13 intended to separate the rim 8 of the lid laterally away from the jar and then to force its way to a firm seat without danger of slipping or breaking the jar, and this bit 13 consists of a chisel face 14 of diamond form, formed integral with the lever, and is provided on its forward edge with a slope 15 that will provide a high point 16 that is sharpened to engage inside the rim of the lid, and then tapered back on the chisel face so that when brought in contact with the edge of the rim there will be a slight drawing effect to the bit that will tend to seat it permanently thereunder when maintained in contact therewith and force the rim outward.

To maintain this contact then, a puncture point 17, formed integral with the shank, is provided at the extreme forward end of the shank, and this point consists preferably of a conical segment whose base 18 is secured, preferably integrally, to the shank, and whose apex is positioned downward to engage the lid and which thus provides a triangular form (in vertical section) positioned with the sloping side toward the rear, and with the flattened vertical surface 19 of the segment at the forward side of the puncture point 17.

In further explanation of the triangle mentioned it must be understood that the vertical section of the puncture point will disclose as the base of the triangle the base 18 of the puncture point at its juncture with the forward end of the shank. The flattened surface ahead will provide the perpendicular side forming a right angle with the base, and the side of the cone to the rear will provide a side opposite the angle, which will form the hypotenuse of the triangle, which hypotenuse will thus be located toward the rear.

By this means there is provided a conical puncture point that is wedge shaped in effect, the sloping side of the wedge being rearward so that by resting the hand upon the outer end of the shank and pressing downward lightly the apex of this puncture point will perforate the lid simultaneously as the handle is raised, and due to the cone shape and wedge effect, will have a tendency to draw the hook 12 forward with ever increasing draft thus positively securing the high point 16 of the chisel face in engagement with the rim of said lid, with the greater draft acting as the hook passes above the rim of the jar, and beyond the danger point of breaking the jar.

Simultaneously with this operation and by inserting the puncture point the flattened side 19 will leave an opening through which air may rush to destroy the vacuum that up to this time has secured the lid in place.

In use the puncture point of the tool is placed upon the top of the lid and positioned thereon to bring the high point of the bit in engagement with the rim of the lid, as shown in Fig. 3 by the solid lines therein, then by pressing down on the shank, as before mentioned, and simultaneously raising on the handle an opening will be provided in the lid and at the same time the bit will engage the rim of the lid and move it to the position shown by the dotted line in this Fig. 3, when the lid being broken loose by this action, may be readily removed by the tool or by the hand of the operator.

By means of the diamond form of the chisel face, as shown in Fig. 2, the front of the bit is inclined to be flat and this flat portion presents a smooth surface disposed to bear against the jar so that upon raising the lid for removal there will be no sharp point coming in contact with the seat 4 of the jar in a manner to chip the jar, and as further protection against chipping, the conical shape of the puncture point will not present a rigidly secured connection between the tool and the lid that would force the bit against the upper edge of the jar with a sufficient force to chip that member, but by the shape of its point the metal surrounding the hole so made by the puncture point would yield against a much less pull than that which would be naturally required to effect the jar.

Having thus described my invention, I claim:

In a jar lid remover, the combination of a lever, a depending hook attached to said lever and provided with a bit having a chisel face of diamond form disposed with a rearward taper and having a sloping and flat forward edge disposed to bear against the jar and providing a sharpened high point, adapted to engage inside the edge of the rim of said lid and with the tapering portion force the rim laterally away from the jar, a puncture point having a flattened side forward, attached to said lever, and adapted with said lever and said hook to simultaneously engage said lid; break the seal of the jar; draw said high point inward into firm engagement with said edge; and force said rim outward.

In testimony whereof I have affixed my signature.

JESSIE L. GOWEN.